United States Patent [19]
Caseiras et al.

[11] Patent Number: 4,937,864
[45] Date of Patent: Jun. 26, 1990

[54] DEBUG ROUTINE ACCESSING SYSTEM

[75] Inventors: Paul D. Caseiras; Joseph L. Filion, both of Rochester; Eugene S. Evanitsky, Pittsford, all of N.Y.

[73] Assignee: Xerox Corporation, Stamford, Conn.

[21] Appl. No.: 343,708

[22] Filed: Apr. 27, 1989

[51] Int. Cl.⁵ .............................................. H04L 9/00
[52] U.S. Cl. ............................................ 380/4; 380/2;
 380/18; 380/21; 380/22; 380/23; 340/825.31;
 340/825.34; 355/204; 371/16.1; 371/19;
 364/186; 364/481; 364/523; 364/551.01
[58] Field of Search .............. 355/203, 204, 205, 207;
 364/221.7, 221.9, 222, 222.5, 226, 245.3,
 246.6–246.9, 248.1, 259.2, 260.81, 265,
 265.1–265.6, 266, 266.1–266.5, 267,
 267.1–267.9, 267.91, 281.9, 282, 286.4–286.6,
 918.7, 919.1, 921.8, 921.9, 928.4, 943.3, 943.7,
 943.9–946.1, 947.2, 952.1, 969, 969.1–969.4,
 970.1, 200; 364/900, 184, 186, 481, 551.01,
 518.523; 340/825.31, 825.34; 371/16.1, 19, 29.1

[56] References Cited

U.S. PATENT DOCUMENTS

| | | | |
|---|---|---|---|
| 3,890,601 | 6/1975 | Pietrolewicz | 364/200 |
| 4,035,072 | 7/1977 | Deetz et al. | 355/204 |
| 4,104,726 | 8/1978 | Fisk et al. | 364/518 |
| 4,107,779 | 8/1978 | Fisk et al. | 364/518 |
| 4,158,886 | 6/1979 | Gray, Jr. et al. | 364/518 |
| 4,206,995 | 6/1980 | Legg | 355/204 |
| 4,458,315 | 7/1984 | Uchenick | 380/4 |
| 4,535,456 | 8/1985 | Bauer et al. | 364/186 X |
| 4,542,452 | 9/1985 | Fukai et al. | 364/186 X |
| 4,558,176 | 12/1985 | Arnold et al. | 380/4 |
| 4,580,232 | 4/1986 | Dugan et al. | 364/523 |
| 4,592,053 | 5/1986 | Matsuura | 371/16.1 |
| 4,599,489 | 7/1986 | Cargile | 380/4 |
| 4,633,405 | 12/1986 | Ito et al. | 364/184 |
| 4,685,053 | 8/1987 | Hattori et al. | 364/184 |
| 4,796,181 | 1/1989 | Wiedemer | 380/4 X |
| 4,870,644 | 9/1989 | Sherry et al. | 371/16.1 |

Primary Examiner—Stephen C. Buczinski
Assistant Examiner—Bernarr Earl Gregory
Attorney, Agent, or Firm—Frederick E. McMullen

[57] ABSTRACT

Debug routine accessing system using special keys in the form of floppy disks for unlocking debug routines embedded in the operating software of a reproduction machine, each debug routine having a key number, with the floppy disks having various key numbers for different ones of the debug routines so that on insertion of a selected disk in the machine floppy disk port, the key number is read from the disk and compared with the key numbers of the various debug routines until a match is found enabling the debug routine represented by the key number to be accessed.

9 Claims, 6 Drawing Sheets

DEBUG ROUTINE ACCESSING SYSTEM

A portion of the disclosure of this patent document contains material which is subject to Copyright protection. The Copyright owner has no objection to the facsimile reproduction by anyone of the patent document or the patent disclosure, as it appears in the Patent and Trademark Office patent file or records, but otherwise reserves all Copyright rights whatsoever.

BACKGROUND OF THE INVENTION

The invention relates to reproduction machines, and more particularly, to a system for controlling access to machine software debug routines.

Modern day reproduction machines such as printers and copiers utilize a software based operating system to perform the essential machine functions and implement the various printing and copying jobs of which the machine is capable. However, software, particularly that used in high speed multi-function machines, is subject to faults, commonly referred to as bugs or glitches, which if not corrected can result in long and wasteful shutdowns and stoppages.

Typically, when a reproduction machine is being designed and the programming software for the machine is being written, the programmers write in debugging routines to test and/or validate the software. These debugging routines may also be used during the prototype testing stages and even during manufacture and assembly to track down problems in the software as they occur and allow changes and corrections to be made before the machine is marketed to customers.

However, even with extensive development and in-house testing that normally accompanies new machines, some bugs and glitches normally remain undetected and find their way into machines delivered to customers. When the machine malfunctions or stops at the customer's site as a result of a bug or glitch in the software, prompt and effective service and repair is necessary if the customer is to remain satisfied. It would therefore be beneficial if some or all of the software debug routines developed as the machine was designed and the software written could be made available to the machine service representatives and even in some instances to the customer himself.

However, debug routines of this nature are normally considered to be highly proprietary and are therefore carefully guarded to prevent disclosure and use by competitors and others. Further, because many of these debug routines, if not used properly, can themselves create problems and cause software failures and crashes, it is not desirable to allow untrained or even partially trained personnel to have access to them.

DISCUSSION OF THE PRIOR ART

In the prior art, a computer system is described in U.S. Pat. No. 3,890,601 to Pietrolewicz having both relatively small high speed memory and relatively large low speed memory, the latter being in the form of a hard disk. Each rigid disk is provided with a password which must be entered into the computer when the disk is installed. The disk password must match with a password in the high speed memory before the computer will run with the new disk. In a similar vein, U.S. Pat. No. 4,599,489 to Cargile discloses a portable key which is inserted into a computer when access is desired, the key providing a pre-coded number. The user types in his own coded number and where the user's number and the coded number provided by the key match, access to the computer is granted.

Another patent, U.S. No. 4,458,315 to Uchenick, discloses a system for preventing unauthorized use of computer programs in which a key number is stored in the computer program and the number revealed only to licensees of the program who are authorized to use the program. Failure to have the correct key number precludes others from accessing or using the protected program. And U.S. Pat. No. 4,558,176 to Arnold et al discloses a system designed to prevent unauthorized copying or using of software in which programs are protected by encapsulation or encryption, with special hardware provided to detect attempts to crack the program and invalidate any information obtained as a result.

SUMMARY OF THE INVENTION

In contrast to the prior art, the present invention provides a process for controlling access to debug routines embedded in the operating software of a reproduction machine when servicing the machine software. The machine includes a memory for storing the software and a floppy disk port with means for reading disks inserted into the port. The aforementioned process comprises the steps of: providing a key number with each of the debug routines for controlling access to the debug routines; providing flopping disks for use in debugging the software with key numbers enabling access to different ones of the debug routines; when access to a debug routine is desired, inserting a disk having a key number corresponding to the key number of the debug routine desired in the disk port; reading the key number on the disk; comparing the disk key number with the key numbers for the debug routines; and enabling the debug routine whose key number matches the key number read from the disk to be accessed.

The present invention further provides a key for enabling special numbered debug routines embedded in the software of a reproduction machine to be accessed when servicing the machine, the key comprising: a floppy disk readable by the machine; the disk having a key number adapted when read by the machine to enable the correspondingly numbered debug routine to be accessed.

DETAILED DESCRIPTION OF THE DRAWINGS

For a better understanding of the present invention, reference may be had to the accompanying drawings in which.

DETAILED DESCRIPTION OF THE PREFERRED EMBODIMENT

Figure 1:
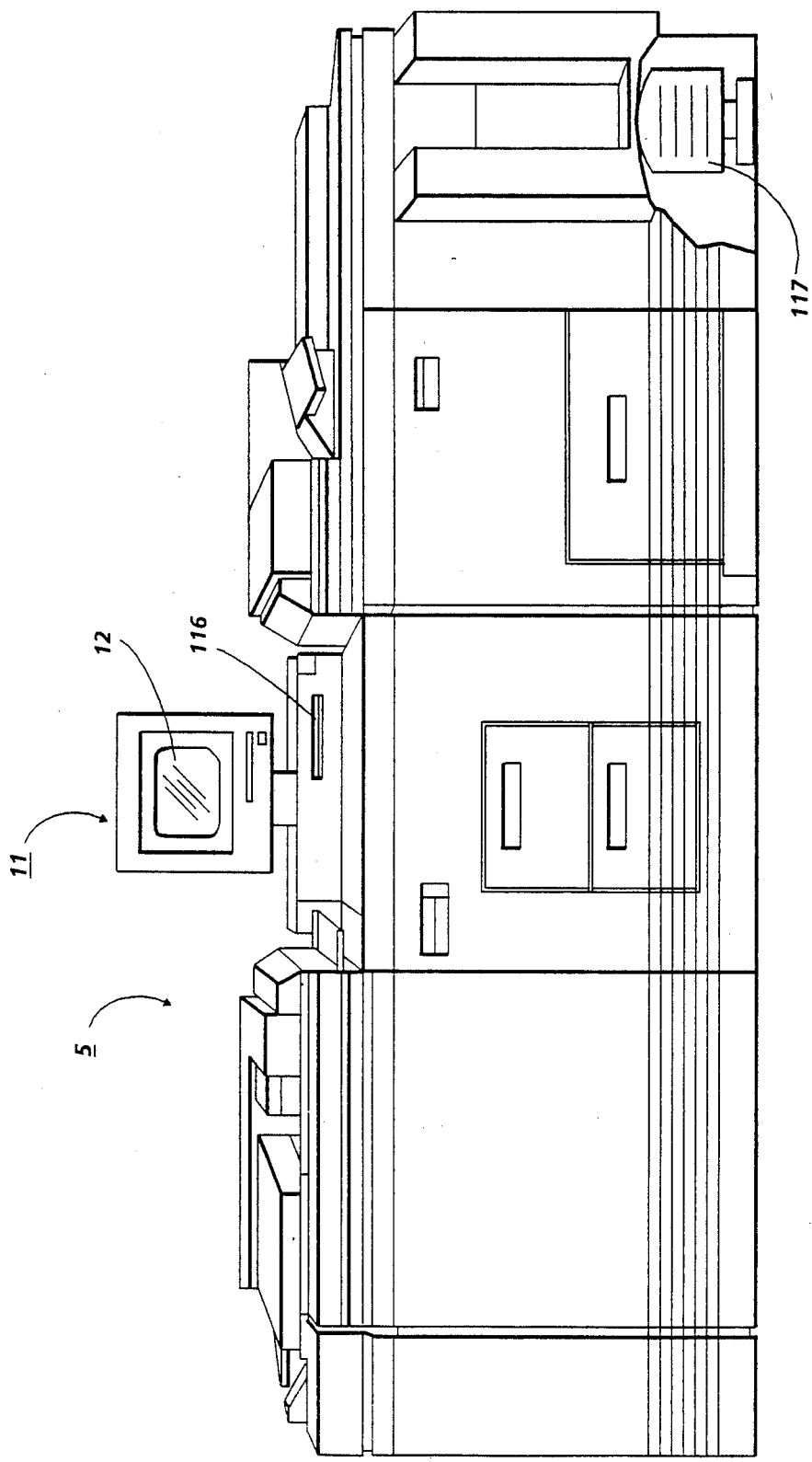
FIG. 1 is an isometric view of an illustrative reproduction machine of the type adapted to use the debug routine accessing system of the present invention.
Figure 2:
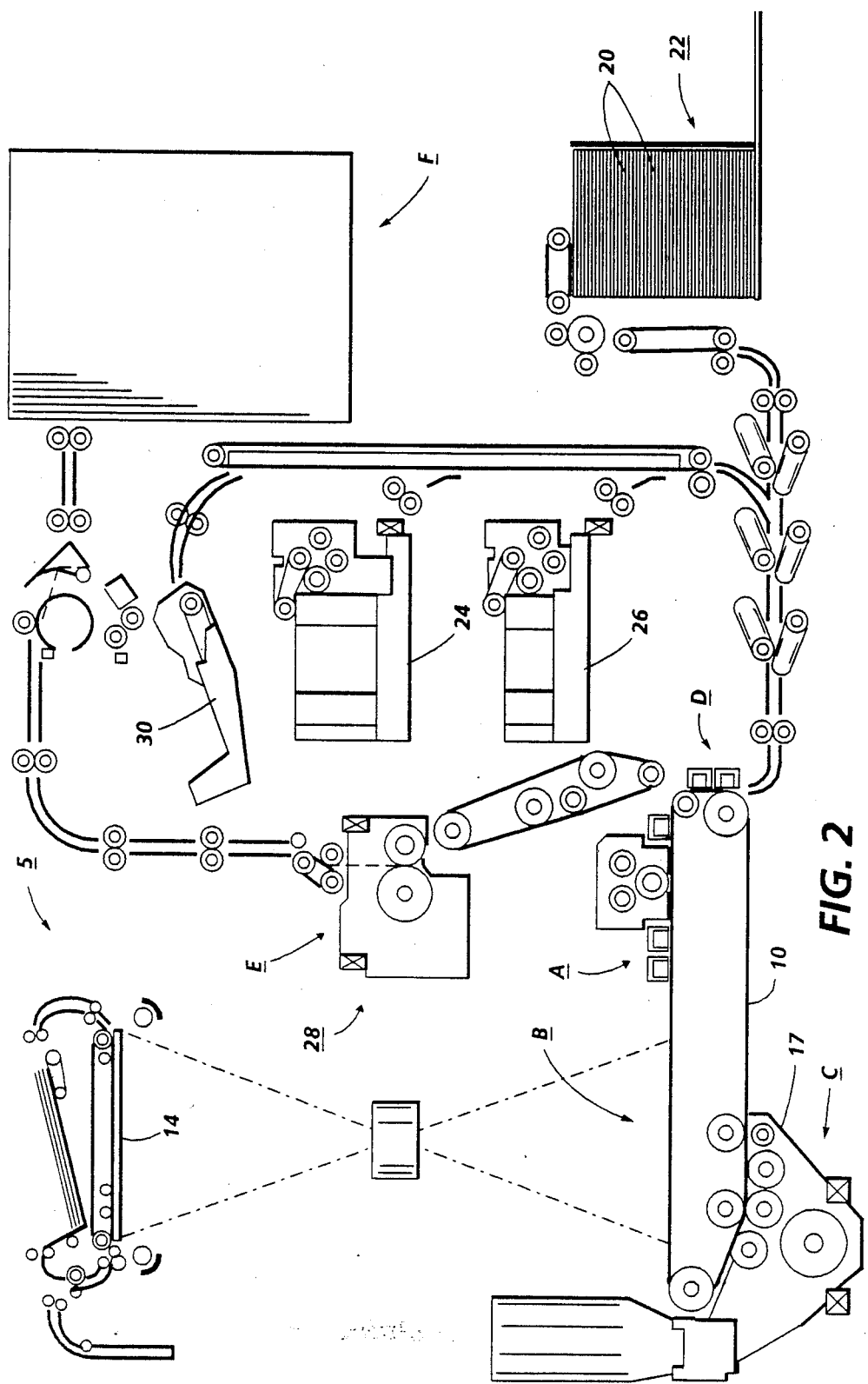
FIG. 2 is a schematic elevational view depicting various operating components and sub-systems of the machine shown in FIG. 1.

For a general understanding of the features of the present invention, reference is made to the drawings. In the drawings, like reference numerals have been used throughout to identify identical elements. Referring to FIGS. 1 and 2, there is shown an electrophotographic reproduction machine 5 composed of a plurality of programmable components and sub-systems which cooperate to carry out the copying or printing job programmed through a touch dialogue screen 12 of a User Interface (U.I.) 11.

Machine 5 has a photoreceptor in the form of a movable photoconductive belt 10 which is charged at charging station A to a relatively high, substantially uniform potential. Next, the charged photoconductive belt is advanced through imaging station B where light rays reflected from the document being copied on platen 14 create an electrostatic latent image on photoconductive belt 10.

The electrostatic latent image is developed at development station C by a magnetic brush developer unit 17 and the developed image transferred at transfer station D to a copy sheet 20 supplied from tray 22, 24, or 26. Following transfer, the copy sheet bearing the transferred image is fed to fusing station E where a fuser 28 permanently affixes the toner powder image to the copy sheet. After fusing, the copy sheets are fed to either finishing station F or to duplex tray 30 from where the sheets are fed back to transfer station D for transfer of the second toner powder image to the opposed sides of the copy sheets.

Figure 3:
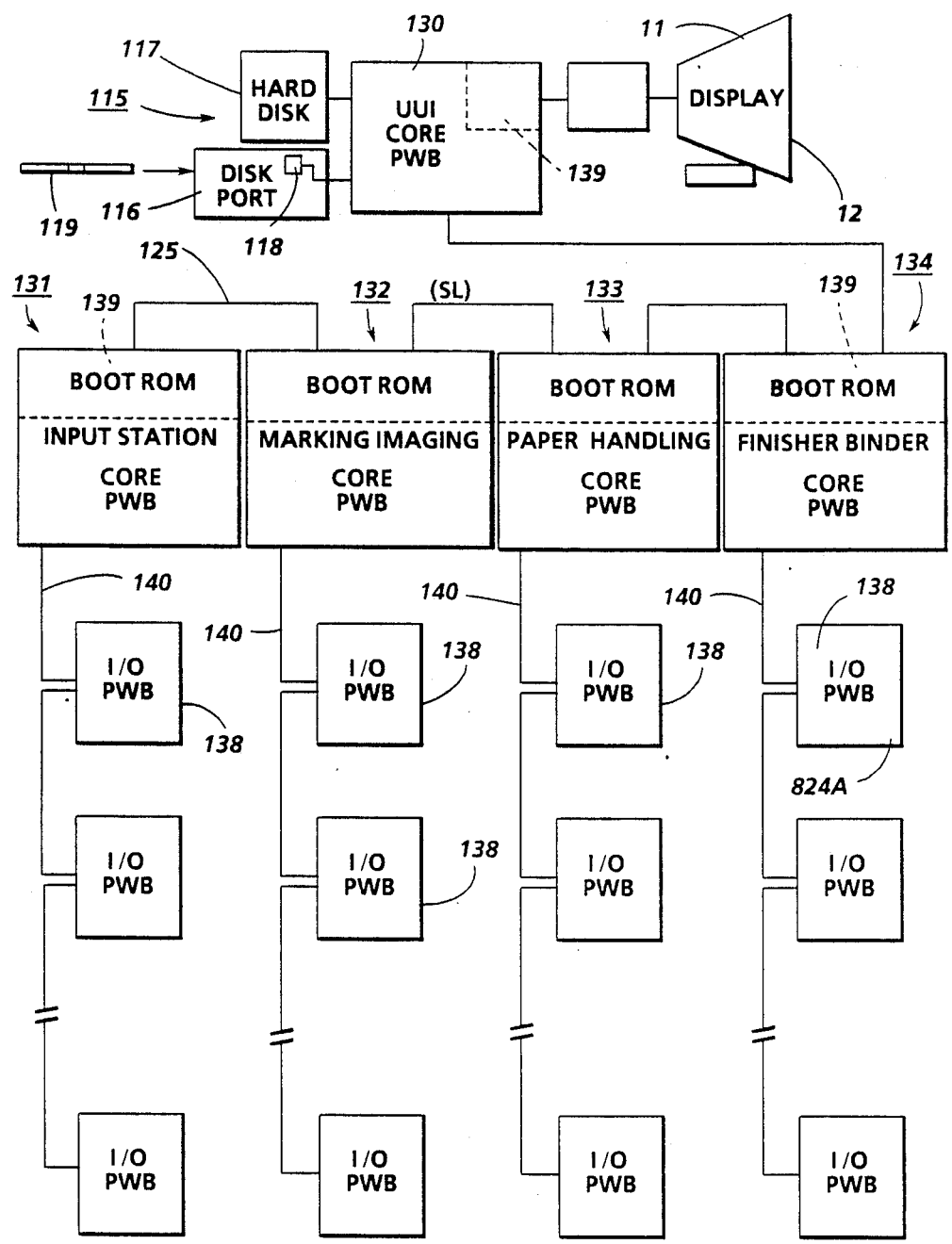
FIG. 3 is a more detailed block diagram depicting the machine Operating System Printed Wiring Boards and shared line connections together with the machine memory and floppy disk port.

Referring to FIG. 3, operation of the various components of machine 5 is regulated by a control system which implements Operating System software stored in memory 115 to operate the various machine components in an integrated fashion to produce copies. The control system includes a plurality of printed wiring boards (PWBs), there being a UI core PWB 130, an Input Station core PWB 131, a Marking Imaging core PWB 132, a Paper Handling core PWB 133, and a Finisher Binder core PWB 134 together with various Input/Output (I/O) PWBs 138. A Shared Line (SL) 125 couples the core PWBs 130, 131, 132, 133, 134 with each other and with memory 115 while local buses 140 serve to couple the I/O PWBs 138 with each other and with their associated core PWB. Programming and operating control over machine 5 is accomplished through touch dialogue screen 12 of UI 11.

Memory 115 includes main memory in the form of a hard or rigid disk 117 on which the machine Operating System is stored. On machine power up, the Operating System is loaded from memory 115 to UI core PWB 130 and from there to the remaining core PWBs 131, 132, 133, 134 via SL 125. Disk 117 preferably comprises two platter, four head disks with a formatted storage capacity of approximately 20 megabytes. Additional ROM, RAM, and NVM memory types are resident at various locations within machine 5, with each core PWB 130, 131, 132, 134 having a boot ROM 139 for controlling downloading of Operating System software to the PWB, fault detection, etc. Boot ROMs 139 also enable transmission of Operating System software and control data to and from PWBs 130, 131, 132, 134 via SL 125 and control data to and from I/O PWBs 138 via local buses 140.

A floppy disk port 116 provides program loading access to memory 115 for the purpose of entering changes to the Operating System, loading specific programs such as diagnostic programs, retrieving stored data such as machine faults, etc. using floppy disks 119. Port 116 includes a suitable read/write head 118 for reading and/or writing from and to a disk 119 in port 116. Floppy disk 119 preferably comprise 3.5 inch, dual sided micro disks with a formatted storage capacity of approximately 720 kilobytes.

Figure 4:
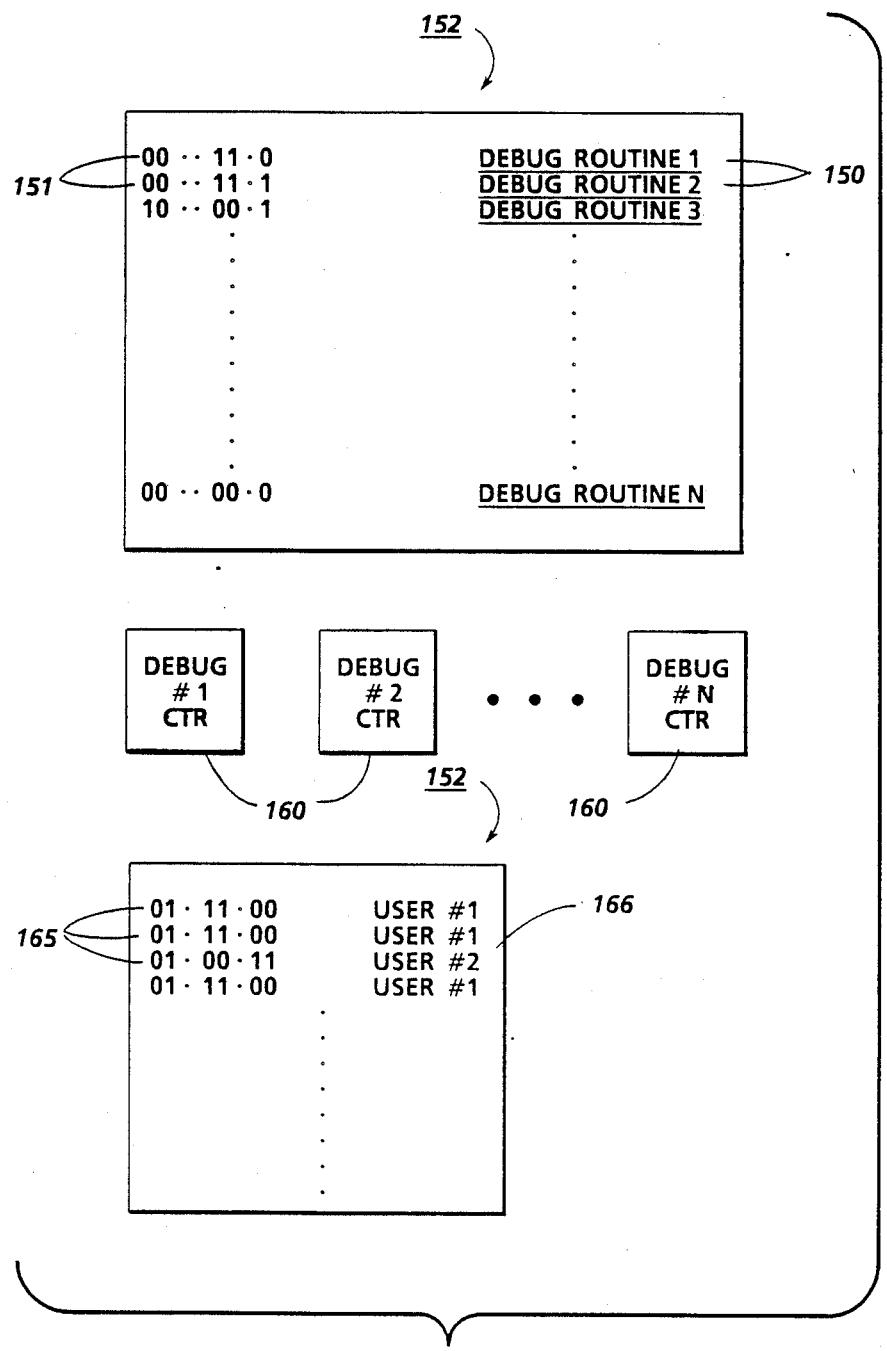
FIG. 4 is a schematic representation of the debug routine table with key numbers, the debug access counters, and the user identification table in software.
Figure 5:
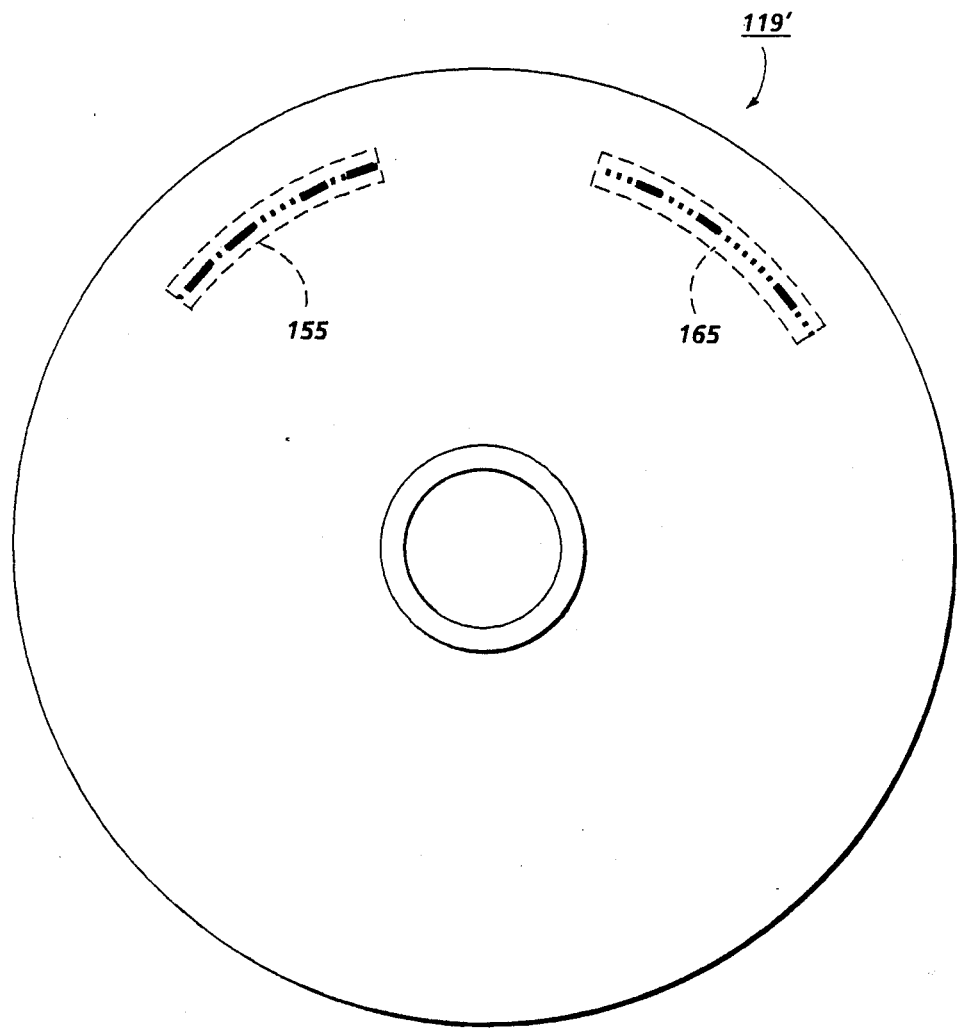
FIG. 5 is an enlarged view of an exemplary floppy disk showing the key number for unlocking a debug routine and disk user identification number.
Figure 6:
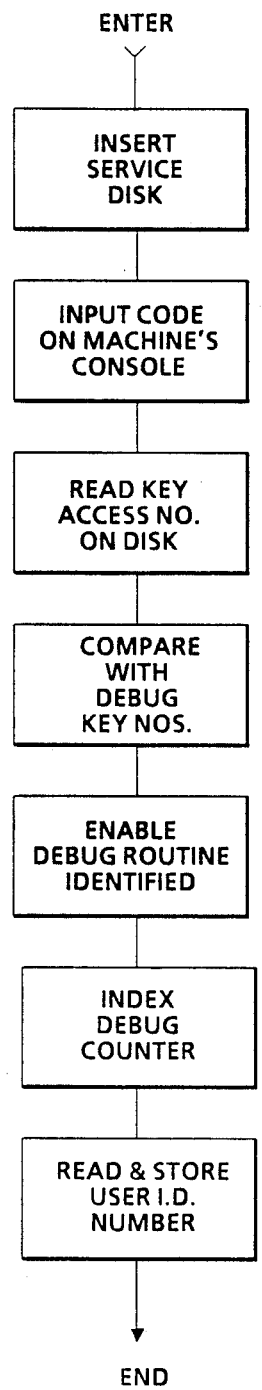
FIG. 6 is a flow chart illustrating the steps by which debug routines are accessed using the floppy disk keys of the present invention.

Referring now particularly to FIGS. 4, 5, and 6 and the software routines "DebugAcess", "FloppyRead", "CheckKeyDisk", "StateExec", and "ExtractData" (Copyright ©1987, 1988 Xerox Corporation. All Rights Reserved) of the Appendix, in order to debug and service machine 5, proprietary debug or service routines or programs 150 are incorporated into the machine Operating System. Debug routines 150 are typically created during the machine design stage and in fact often represent software routines used by the design engineers during design, building, and testing of the machine prototypes. Because of their value and the fact that they go to the very heart of the machine Operating System, programs of this type are very valuable and hence highly proprietary.

To enable a Tech Rep or in some cases a trusted and experienced machine user to access debug routines 150 when servicing machine 5 while at the same time precluding access by non-accredited persons, each debug routine 150 or group of debug routines is assigned a specific key number 151. Key numbers 151, which preferably are in the form of a binary number, are stored in a table 152 in main memory 117.

To control and restrict access to the debug routines 150, an entry key in the form of a special service disk 119' is used. Each individual service disk 119' has embedded therein a predetermined key number 155 or even a series of key numbers 155 which when matched with one or more of the key numbers 151 stored in table 152 of memory 117, unlocks the debug routine or routines represented by the key number on the disk.

In use, when a Tech Rep is servicing machine 5 and wishes to access one of the debug routines 150, the Tech Rep inserts the proper service disk 119' into port 116 having the key number 155 of the debug routine 150 desired. After inputting an acceptable code through the machine console, service disk 119' is scanned by head 118 and the key number 155 or numbers on the disk read. The machine Operating System compares the key number 155 read from disk 119' with the key numbers 151 for the debug routines in table 152 of memory 117. Where a valid comparison is achieved, access to the debug routine or routines represented by the key number on the inserted service disk is granted, permitting the Tech Rep to bring up and use the debug routine or routines.

Where an invalid comparison results, the user is denied access to the debug program.

Counters 160 are provided in the machine software to record the number of times each one of the debug routines 150 is accessed. As will be understood, this permits evaluation of the machine Operating System and servicing, and helps identify recurring problem areas.

Preferably, a user identification number 165 is included with each key number 155 on service disks 119' identifying the owner or user, typically the Tech Pep, of the floppy disk. Each time the machine is serviced and one of the service disks 119' used to access one or more of the debug routines, the user identification number 165 is read and stored in a table 166 in memory 117. From that information, the identity of the person or persons who have serviced machine 5 and the particular debug routine or routines used can be identified.

While the invention has been described with reference to the structure disclosed, it is confined to the details set forth, but is intended to cover such modifications or changes as may come within the scope of the following claims.

We claim:

APPENDIX

Copyright © 1987, 1988, 1989 Xerox Corporation. All Rights Reserved

DebugAccess: PROCEDURE[Routine : SHORT CARDINAL] RETURNS [BOOLEAN] =

ENTER

```
IF codeArray[Routine] = xx#xx THEN
  access ← TRUE;
ELSE
  access ← FALSE;
END IF;
```

RETURN[access];

END          PROCEDURE                              DebugAccess;--
= = = = = = = = = = = = = = = = = = = = = = = = = = = = = = = = = = = =
= = = = = = = = = = = = = = = = = = = = = = = = = = = = = = = = = = = =
= = =

-- Name: FloppyRead
-- Calls: ZeroBuffer, Floppy
-- Function: This process will read the floppy disk key that has been inserted in
-- the disk drive after the correct key sequence has been selected on the key
-- board. The codes on the floppy are read into the buffer. These codes enable or
-- disable certain debug routines.

= = = = = = = = = = = = = = = = = = = = = = = = = = = = = = = = = = = =
= = = = = = = = = = = = = = = = = = = = = = = = = = = = = = = = = = = =
= = =

FloppyRead : PROCESS[] =

ENTER

```
FOR bufferIndex ← 0 UPTO bufferLength LOOP
  buffer[bufferIndex] ← 0;
```

END LOOP;

[validKey] ← DCxxx.CheckKeyDisk[.eleven,@buffer,.eleven,passwordPointer];

IF validKey THEN

[status] ← Floppy.Initialize[.justMemory];

[status] ← Floppy.OpenFile[codeFileName,.read];
  IF status = .noError THEN
   [status] ← Floppy.ReadFile[1,.eleven,@buffer];
   IF status = .noError THEN
        FOR index ← 0 UPTO 15 LOOP
          codeArray[index] ← buffer[index];
        END LOOP;
   END IF;
  END IF;
 END IF;

END PROCESS FloppyRead;

================================================================
================================================================
---| Main Procedure CheckKeyDisk                    |
-                                                           -
================================================================
================================================================
ENTER PasswordOK ← TRUE;
State ← 1;
WHILE State <> 0 LOOP;
 [Status, NextState] ← StateExec[State];

IF Status <> .noError THEN
  PasswordOK ← FALSE;
  State ← 0;
 ELSE
  State ← NextState;

```
  END IF;
END LOOP;

RETURN[PasswordOK];
END                    PROCEDURE                    CheckKeyDisk;
===========================================================
==================================================

StateExec: PROCEDURE [CurrentState: Byte] RETURNS [Byte,Byte] =
  NextState   : AppsPublicData Byte;
  Match       : AppsPublicData BOOLEAN;
ENTER
  Status ← .noError;
  NextState ← CurrentState + 1;

BigLoop: SELECT CurrentState FROM

CASE = 1:              -- re-init memory and floppy (restore heads)
          OSExtra.FloppyRestore [@Status];
          index ← 0;
          formatBuffer ← RECAST[TrackBuffer];
          OS.ReadOffPage [PasswordPage, RECAST[PasswordPtr],
RECAST[@EnteredPass],
                PASSWORDLENGTH + 1];
          OS.WriteOffPage [RECAST[@Zeros], .eleven, RECAST[@ComparePass],
                ENCRYPTEDPASSWORDLEN + 1];

CASE = 2:              -- Position Floppy Head to Cyl 81
          index ← index + 1;
          OSExtra.FloppyStepIn[@Status];
          IF index < 81 THEN
           NextState ← CurrentState;
          END IF;

CASE = 3:
          Head ← 1;        -- read Track from Cyl 81 and extract data

OSExtra.FloppyReadTrack[Head,TrackPage,RECAST[formatBuffer],@Status];
          Status ← .noError;
          ExtractData[1];
```

```
    CASE = 4:              -- Position to Cyl 82
            OSExtra.FloppyStepIn[@Status];

CASE = 5:
            Head ← 0;        -- read Track from Cyl 82 and extract data OSExtra.FloppyReadTrack[Head,TrackPage,RECAST[formatBuffer],@Status];
            ExtractData[2];
            Status ← .noError;

CASE = 8:              -- Calculate Encrypted Key
            ComputeKey [];
            index ← 0;

CASE = 9:
            IF EncryptedPass[index] < > ComparePass[index] THEN
             Status ← .accessDenied;
            END IF;
            index ← index + 1;
            IF index < = ENCRYPTEDPASSWORDLEN THEN
             NextState ← CurrentState;
            END IF;

CASE = 10:
            NextState ← 0;

END SELECT BigLoop;
  RETURN [Status, NextState];
  END PROCEDURE StateExec;

-= = = = = = = = = = = = = = = = = = = = = = = = = = = = = = = = = =

ExtractData: PROCEDURE [Position: Byte] =
Offset         : Word;
ENTER
   -- find start of data buffer position in buffer
   Offset ← 16#A0;
   WHILE Offset < 16#FF LOOP;
    IF formatBuffer↑ [Offset] = 16#C2 AND
```

```
            formatBuffer↑ [Offset + 1] = 16#A1 AND
            formatBuffer↑ [Offset + 2] = 16#A1 AND
            formatBuffer↑ [Offset + 3] = 16#FB THEN
                EXIT LOOP;
    ELSE
            Offset ← Offset + 1;
    END IF;
END LOOP;
IF Offset < 16#FF THEN
    IF Position = 1 THEN
            ComparePass[0] ← formatBuffer↑ [300 + Offset];
            ComparePass[1] ← formatBuffer↑ [301 + Offset];
            ComparePass[2] ← formatBuffer↑ [302 + Offset];
            ComparePass[3] ← formatBuffer↑ [303 + Offset];
    ELSE
            ComparePass[4] ← formatBuffer↑ [300 + Offset];
            ComparePass[5] ← formatBuffer↑ [301 + Offset];
            ComparePass[6] ← formatBuffer↑ [302 + Offset];
            ComparePass[7] ← formatBuffer↑ [303 + Offset];
    END IF;
END IF;
END PROCEDURE ExtractData.
```

1. A process for controlling access to debug routines embedded in the operation software of a reproduction machine when servicing said software, said machine including a memory for storing said software, and a floppy disk port with means for reading disks inserted into said port, comprising the steps of:
   (a) providing a key number with each of said debug routines for controlling access to said debug routines;
   (b) providing floppy disks for use in debugging said software with key numbers enabling access to different ones of said debug routines;
   (c) when access to one of said debug routines is desired, inserting a disk having a key number corresponding to the key number for said one debug routines in said disk port;
   (d) reading the key number on said disk;
   (e) comparing said disk key number with the key numbers for said debug routines; and
   (f) where the key number from said disk matches the key number for said one debug routine, enabling said one debug routine to be accessed.

2. The process according to claim 1 including the step of: maintaining a count in said memory of each time each one of said debug routines is accessed.

3. The process according to claim 1 including the steps of:
   (a) providing a user identification number on each of said disks;
   (b) providing a user log in said memory;
   (c) on insertion of a disk in said port, reading said user identification number; and
   (d) storing said user identification number in said user log whereby to maintain a record identifying users accessing said debug routines.

4. The process according to claim 3 including the step of:
   (a) reading said disk key number to said user log; and
   (b) storing said disk key number in said user log whereby to maintain a record identifying each time one of said debug routines is accessed.

5. A process for accessing debug routines embedded in the operating softwave of a reproduction machine when servicing said software, said softwave having individual key numbers controlling access to said debug routines, said machine including a memory for storing said software, and a floppy disk port with means for reading disks inserted into said port, comprising the steps of:
   (a) providing a key to unlock said debug routines in the form of floppy disks having key numbers enabling access to different ones of said debug routines in said machine memory;
   (b) inserting a selected one of said floppy disks in said port;
   (c) reading the key number on said one floppy disk;
   (d) comparing said key number from said one floppy disk with said key numbers for said debug routines;

(e) where said key number from said one floppy disk matches one of said key numbers for said debug routines, enabling access to the debug routine associated with said one key number.

6. The process according to claim 5 including the steps of:
 (a) providing a second key number on each of said floppy disks identifying the disk owner;
 (b) reading said second key number on said one floppy disk when said one floppy disk is inserted in said port;
 (c) storing said second key number in said machine memory whereby to retain a record identifying the person accessing said debug routine.

7. A process for controlling access to debug routines embedded in the operating software of a reproduction machine when servicing said software, said machine including a memory for storing said software, and a floppy disk port with means for reading disks inserted into said port, comprising the steps of:
 (a) embedding plural software debug routines in said machine software;
 (b) assigning key numbers to each of said debug routines;
 (c) inserting a floppy disk having at least one key number for accessing said debug routines in said port;
 (d) reading said key number on said disk;
 (f) comparing said key number from said disk with said key numbers for said debug routines;
 (g) where said key number from said disk matches one of said key numbers for said debug routines, enabling said one debug routine to be accessed for use in debugging said machine software.

8. A key for enabling special numbered debug routines embedded in the software of a reproduction machine to be accessed when servicing the machine, said key comprising:
 (a) a floppy disk readable by said machine;
 (b) said disk having a key number adapted when read by said machine to enable the correspondingly numbered debug routine to be accessed.

9. The key according to claim 8 including a user identification number on said floppy disk, said user identification number when read by said machine identifying the person granted access to said debug routine.

* * * * *